(12) United States Patent
Yeh et al.

(10) Patent No.: US 11,065,687 B2
(45) Date of Patent: Jul. 20, 2021

(54) METHOD FOR MANUFACTURING METAL PRODUCT WITH TWO BLANKS

(71) Applicant: CHAMP TECH OPTICAL (FOSHAN) CORPORATION, Foshan (CN)

(72) Inventors: Dung-Chang Yeh, New Taipei (TW); Yi-Fan Lin, Foshan (CN); Jin-Hong Zhu, Foshan (CN)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 209 days.

(21) Appl. No.: 15/859,764

(22) Filed: Jan. 2, 2018

(65) Prior Publication Data
US 2019/0168307 A1 Jun. 6, 2019

(30) Foreign Application Priority Data
Dec. 6, 2017 (CN) .......................... 201711306212.2

(51) Int. Cl.
| | | |
|---|---|---|
| *B22F 7/06* | (2006.01) | |
| *B22F 5/10* | (2006.01) | |
| *B22F 3/22* | (2006.01) | |
| *B23K 20/10* | (2006.01) | |

(52) U.S. Cl.
CPC .............. *B22F 7/062* (2013.01); *B22F 3/225* (2013.01); *B22F 5/10* (2013.01); *B22F 5/106* (2013.01); *B23K 20/10* (2013.01)

(58) Field of Classification Search
CPC .. B22F 3/225; B22F 5/10; B22F 5/106; B22F 7/06; B22F 7/062; B23K 20/10
See application file for complete search history.

(56) References Cited

U.S. PATENT DOCUMENTS

| | | | | |
|---|---|---|---|---|
| 5,015,136 | A | * 5/1991 | Vetter ...................... | B21J 15/02 29/444 |
| 2003/0039571 | A1 | * 2/2003 | Lim ........................ | B22F 3/225 419/6 |
| 2005/0182176 | A1 | * 8/2005 | Wohlfromm ............ | B22F 3/225 524/439 |
| 2008/0095654 | A1 | * 4/2008 | Engquist .................. | B22F 5/08 419/25 |

(Continued)

FOREIGN PATENT DOCUMENTS

| | | |
|---|---|---|
| CN | 101005003 | 7/2007 |
| CN | 101712115 | 5/2011 |

(Continued)

*Primary Examiner* — Anthony J Zimmer
*Assistant Examiner* — Sean P. O'Keefe
(74) *Attorney, Agent, or Firm* — ScienBiziP, P.C.

(57) ABSTRACT

A method for manufacturing hollow and other metal products of irregular shape provides metal powder and binding agent, and the two are feed-mixed and heated to a plastic state. The feed-mix is injected in a mold cavity of a first injection mold to form a first blank, and injected in a mold cavity of a second injection mold to form a second blank. The first blank and the second blank are welded together to form a built-up blank which is degreased to remove the binding agent therein. The degreased built-up blank is sintered to obtain the metal product of irregular shape.

4 Claims, 5 Drawing Sheets

(56) References Cited

U.S. PATENT DOCUMENTS

| | | | | |
|---|---|---|---|---|
| 2012/0136400 A1* | 5/2012 | Julien | .................. | A61F 2/28 |
| | | | | 606/86 R |
| 2013/0239410 A1* | 9/2013 | Chung | ................. | F28D 15/02 |
| | | | | 29/890.032 |
| 2015/0377063 A1* | 12/2015 | Scalzo | ................. | B23K 26/08 |
| | | | | 419/6 |
| 2016/0184933 A1* | 6/2016 | Armstrong | ........... | B23K 1/0008 |
| | | | | 220/4.01 |
| 2017/0361540 A1* | 12/2017 | Li | ...................... | B23K 20/22 |

FOREIGN PATENT DOCUMENTS

| | | |
|---|---|---|
| CN | 103344353 A | 10/2013 |
| CN | 106216688 | 12/2016 |

\* cited by examiner

METHOD FOR MANUFACTURING METAL PRODUCT WITH TWO BLANKS

FIELD

The subject matter herein generally relates to metal injection molding field, especially to a metal injection molding method for manufacturing metal product.

BACKGROUND

Generally, both mold forming and CNC (Computer Numerical Control) milling find it difficult to process special-shaped metal product, such as hollow products and inverted fasteners. Using existing metal injection molding method to manufacture this kind of special-shaped metal products, defects are usual. The above-mentioned disadvantages need to be overcome.

BRIEF DESCRIPTION OF THE DRAWINGS

Implementations of the present technology will now be described, by way of example only, with reference to the attached figures.

DETAILED DESCRIPTION

Figure 1:
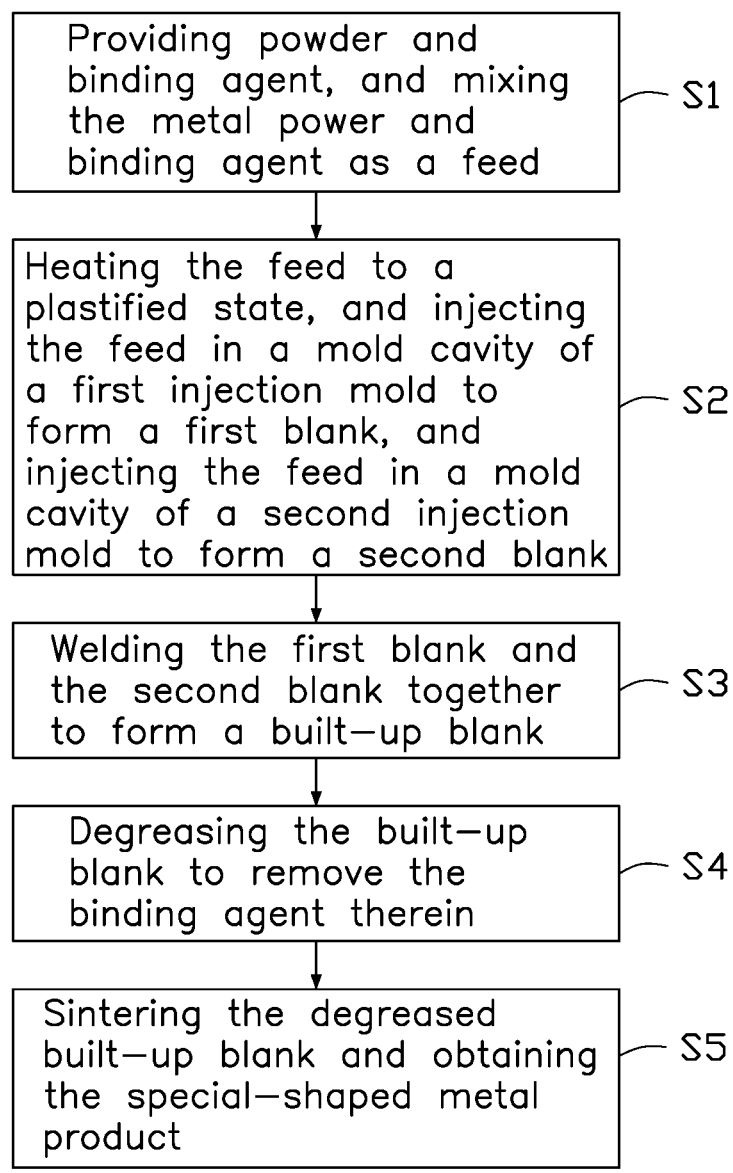
FIG. 1 is a flowchart of a manufacturing method for metal product with two blanks.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a method for manufacturing metal product with two blanks according to one embodiment. The method is provided by way of example as there are a variety of ways to carry out the method. The metal product refers to a metal product which cannot directly obtained via a method of injection molding, demoulding, and sintering. The method can be used to manufacture hardware components, components of 3C products, industrial machinery components and so on. The method can begin at block 201.

At block 201, as shown in FIG. 1, a powder and binding agent are provided, and the powder and binding agent are feed-mixed. The powder is selected from metal powder, ceramic powder, or pre-alloyed powder. A particle diameter of the powder is in a range between 0.01-50 um, and preferably in a range between 0.1-30 μm.

The binding agent is a wax based binder or a plastic binder.

At block 202, the feed-mix is heated to be in a plastic state, and the feed-mix is injected in a mold cavity of a first injection mold to form a first blank. The feed-mix is also injected in a mold cavity of a second injection mold to form a second blank. A structure of the first blank may be same as structure of the second blank or may be different to structure of the second blank.

At block 203, the first blank and the second blank are assembled together to form a built-up blank. That is to say, the first blank and the second blank are bonded together in the blank phase, this avoids a metal melting zone and a heat-affected zone in the substrate. Metallurgical defects such as cracks and deformations are also avoided. The final appearance of the metal product also benefits from the absence of heat at this stage.

A welding method for the bonding comprises ultrasonic welding, friction pressure welding, or heating and pressure welding. By welding, powder particles in the first blank and powder in the second blank contact each other, and thereby, the first blank and the second blank are strongly bonded.

At block 204, the built-up blank is degreased to remove the binding agent therein. If the binding agent it is a wax based binder, a solvent is first applied and then a hot degreasing is applied. If the binding agent is a plastic binder, a catalyzed degreasing is used.

At block 205, the degreased built-up blank is sintered. The sintering temperature is about 1100-1350° C., the sintering time is about 0.5-5 hours, and the cooling rate is about 3-30° C./minute.

At block 205, a process of tempering by heat is applied to the sintered product, and the metal product is obtained. The tempering temperature is 150-400° C. and the tempering time is 0.5 to 5 hours.

EXAMPLE 1

As shown in FIG. 2, the metal product 100 also formed by a first blank 10 and a second blank 20, and an edge of the first blank 10 is bonded with an edge of the second blank 20. A hollow cavity 101 is thereby formed. The hollow cavity 101 can be a sealed cavity, similar to a table tennis ball, and the hollow cavity 101 can also be unsealed, which similar in shape to a teapot for example. In the illustrated embodiment, the hollow cavity 101 is sealed and substantially a spherical shape. The hollow cavity also can be a spheroid.

Figure 2A:
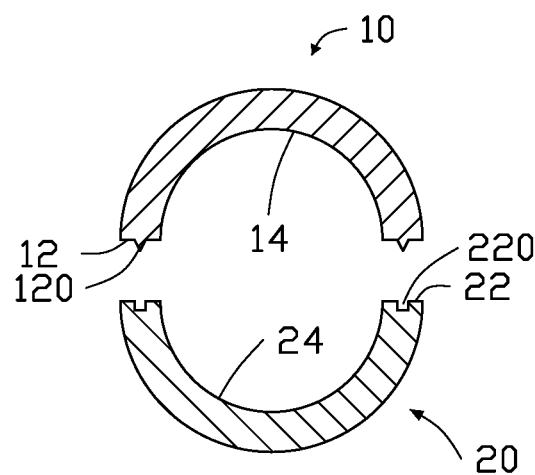
FIG. 2A is a cross-section view of providing a first blank and a second blankin one exemplary embodiment.

In detail, as shown in FIG. 2A, the first blank 10 comprises a first mating surface 12 and a first cavity 14 surrounded by the first mating surface 12. The second blank 20 comprises a second mating surface 22 and a second cavity 24 surrounded by the second mating surface 22. The first mating surface 12 is configured to fit with the second mating surface 22, and the first cavity 14 and the second cavity 24 together form the hollow cavity 101.

In the illustrated embodiment, the first mating surface 12 comprises a first matching portion 120, and the second mating surface 22 comprises a second matching portion 220 corresponding to the first matching portion 120.

Figure 2B:
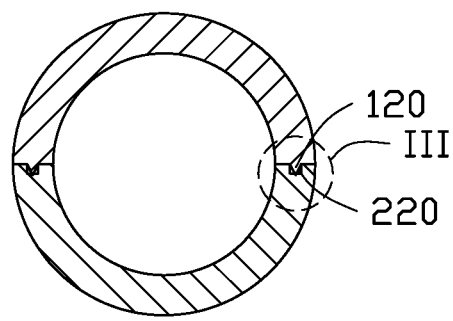
FIG. 2B is a cross-section view of attaching the first blank and the second blank together to form a built-up blank in FIG. 2A.
Figure 3:
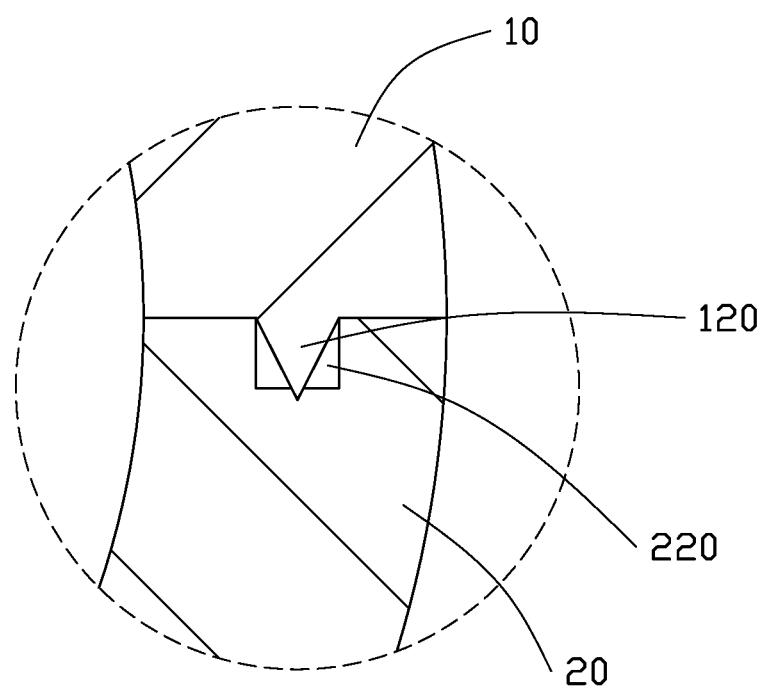
FIG. 3 is an enlarged view of a metal product produced by the method of FIG. 1.

In the illustrated embodiment, as shown in FIG. 3, a cross section of the first matching portion 120 is triangular, the second matching portion 220 is a groove. As shown in FIG. 2B, the first matching portion 120 and the second matching portion 220 are a point of contact, an apex of the first matching portion 120 is melted gradually during the welding process and fills the second matching portion 220. In the embodiment, the first blank 12 is welded with the second blank 22 via an ultrasonic welding method.

Figure 2C:
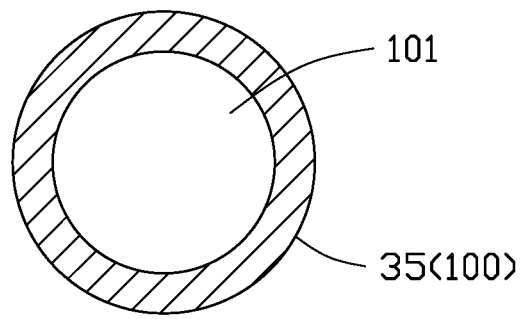
FIG. 2C is a cross-section view of the built-up blank undergoing the step of degreasing and sintering to form a metal product.

After the step of welding, the built-up blank undergoes the step of degreasing and sintering to form the metal product 100, as shown in FIG. 2C.

EXAMPLE 2

As shown in FIG. 4, the metal product 200 is different from the metal product 100 shown in FIG. 2. The metal product 200 is also formed from a first blank 30 and a second blank 40. The first blank 30 and the second blank 40 are bonded together other than at the edges, and edges of the first blank 30 and the second blank 40 are spaced from each other.

Figure 4A:
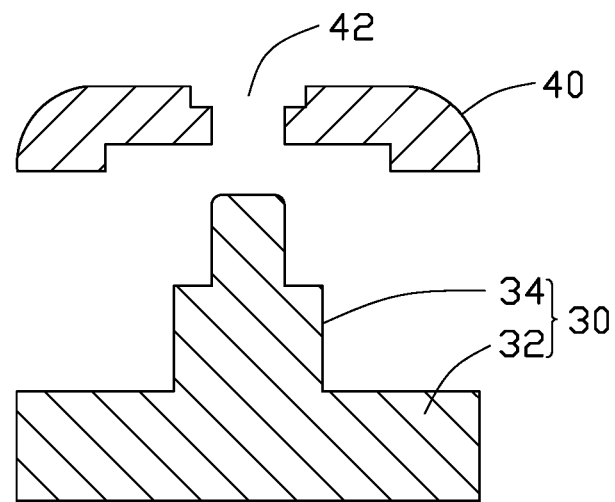
FIG. 4A is a cross-section view of providing a first blank and a second blankin one exemplary embodiment.

In detail, as shown in FIG. 4A, the first blank 30 comprises a base 32 and a supporting pillar 34 protruding from the base 32, and the supporting pillar 34 comprises a stepping portion 341.

The second blank 40 is an inverted fastener, the second blank 40 comprises an inserting hole 42 matching the stepping portion 341.

Figure 4B:
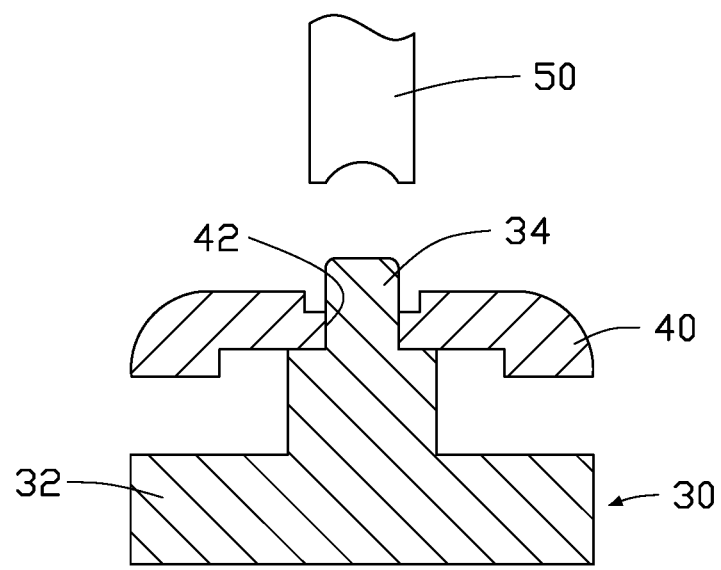
FIG. 4B is a cross-section view of assembling the first blank and the second blank together to form a built-up blank in FIG. 4A.
Figure 4C:
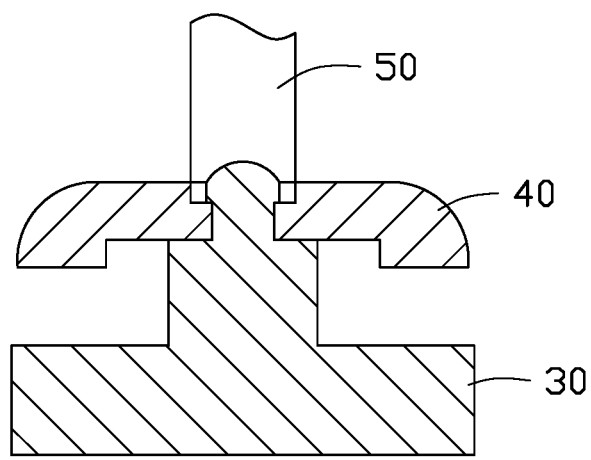
FIG. 4C is a cross-section view of providing a heating and pressure equipment and applying the heating and pressure equipment to the built-up blank.
Figure 4D:
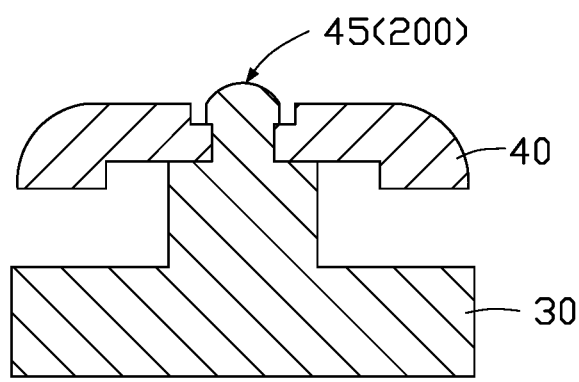
FIG. 4D is a cross-section view of the built-up blank undergoing a step of degreasing and sintering to form a metal product.

Before the welding step, the second blank 40 is disposed on the first blank 30, as shown in FIG. 4B, and the supporting pillar 34 passes through the inserting hole 42. The supporting pillar 34 protrudes from the inserting hole 42. Heating and pressure equipment 50 is provided, and the heating and pressure equipment 50 is applied on the supporting pillar 34, as shown in FIG. 4C, and then the first blank 40 and the second blank 40 are bonded together to form a built-up blank, as shown in FIG. 4D.

After the step of welding, the built-up blank undergoes the step of degreasing and sintering to form the metal product of irregular shape 200.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for manufacturing metal product comprising:
providing powder and binding agent, and mixing the powder and binding agent as a feed;
heating the feed to a plastified state, and injecting the feed in a mold cavity of a first injection mold to form a first blank, and injecting the feed in a mold cavity of a second injection mold to form a second blank;
welding the first blank and the second blank together to form a built-up blank;
degreasing the built-up blank to remove the binding agent therein; and
sintering the degreased built-up blank and obtaining the metal product;
wherein the first blank comprises a base and a supporting pillar protruding from the base, the second blank comprises a first inserting hole and a second inserting hole aligned with the first inserting hole, the second hole is larger than the first inserting hole and equivalent in size to a size of a heating and pressurizing equipment, the second blank is disposed on the first blank, the supporting pillar passes through the first inserting hole and protrudes from the second inserting hole, the second blank is spaced apart from the base, the first blank and the second blank are bonded together to form a built-up blank by heating and applying pressure to the supporting pillar by the heating and pressurizing equipment.

2. The method for manufacturing metal product of claim 1, wherein the sintering temperature is 1100° C. to 1350° C., and the sintering period of time is 0.5 hour to 5 hours.

3. The method for manufacturing metal product of claim 2, wherein after sintering the degreased built-up blank, the method further comprising a tempering heat treatment process, wherein a tempering temperature of the tempering heat treatment process is 150° C. to 400° C. and a tempering time period is 0.5 hour to 5 hours.

4. The method for manufacturing metal product of claim 1, wherein the supporting pillar comprises a stepping portion, the second blank is an inverted fastener, the second blank is positioned on the stepping portion.

* * * * *